(12) United States Patent
Lambrecht et al.

(10) Patent No.: US 7,066,439 B2
(45) Date of Patent: Jun. 27, 2006

(54) THREE DIRECTIONAL SUPPORT MECHANISM FOR VEHICLE WHEELS

(76) Inventors: Willy Lambrecht, Schaessestraat 38, B-9070 Destelbergen (BE); Johan Lambrecht, Schaessestraat 38, B-9070 Destelbergen (BE)

( * ) Notice: Subject to any disclaimer, the term of this patent is extended or adjusted under 35 U.S.C. 154(b) by 0 days.

(21) Appl. No.: 10/399,642

(22) PCT Filed: Oct. 17, 2001

(86) PCT No.: PCT/BE01/00182

§ 371 (c)(1), (2), (4) Date: Sep. 8, 2003

(87) PCT Pub. No.: WO02/33345

PCT Pub. Date: Apr. 25, 2002

(65) Prior Publication Data

US 2004/0026591 A1 Feb. 12, 2004

(30) Foreign Application Priority Data

Oct. 18, 2000 (EP) .................................. 00870233

(51) Int. Cl.
*F16M 11/00* (2006.01)

(52) U.S. Cl. ........................ 248/678; 73/122; 269/73

(58) Field of Classification Search ................ 248/352, 248/660–663, 678; 33/203.14, 203.12; 73/117, 73/11.04, 121–132; 269/73, 71
See application file for complete search history.

(56) References Cited

U.S. PATENT DOCUMENTS

| 3,823,485 | A | | 7/1974 | Lambrecht | 33/203.14 |
| 4,567,667 | A | | 2/1986 | Minagawa et al. | 33/203.12 |
| 4,924,591 | A | * | 5/1990 | Brodu | 33/203.14 |
| 5,287,626 | A | * | 2/1994 | Reich | 33/1 N |
| 5,303,035 | A | | 4/1994 | Luecke et al. | 356/399 |
| 5,569,836 | A | * | 10/1996 | Hill | 73/11.07 |
| 5,604,296 | A | | 2/1997 | Nozaki | 73/11.04 |
| 5,864,053 | A | * | 1/1999 | Nozaki | 73/11.07 |
| 6,317,992 | B1 | * | 11/2001 | Lin | 33/203.14 |
| 6,460,259 | B1 | * | 10/2002 | Naruse | 33/203.14 |

FOREIGN PATENT DOCUMENTS

| BE | 772.697 | 1/1972 |
| DE | 28 38 399 A | 3/1980 |
| DE | 39 01 342 A | 7/1990 |
| EP | 0 151 951 A | 8/1985 |
| GB | 2214879 | 9/1989 |
| JP | 2-221840 | 9/1990 |
| JP | 9-329530 | 12/1997 |

OTHER PUBLICATIONS

International Search Report dated Mar. 5, 2002.

* cited by examiner

*Primary Examiner*—Korie Chan
(74) *Attorney, Agent, or Firm*—Ostrolenk, Faber, Gerb & Soffen, LLP

(57) ABSTRACT

A device with at least a supporting arrangement is coupled to a movement-system making the upper-plate moving. The device is characterized in that it includes a mechanism by which the supporting arrangement may be moved vertically thanks to the operation of a movement-system, whereby this mechanism comprises at least the following elements: a ball-housing with a ball; a threshold-block with a bearing surface on which the ball rests.

47 Claims, 8 Drawing Sheets

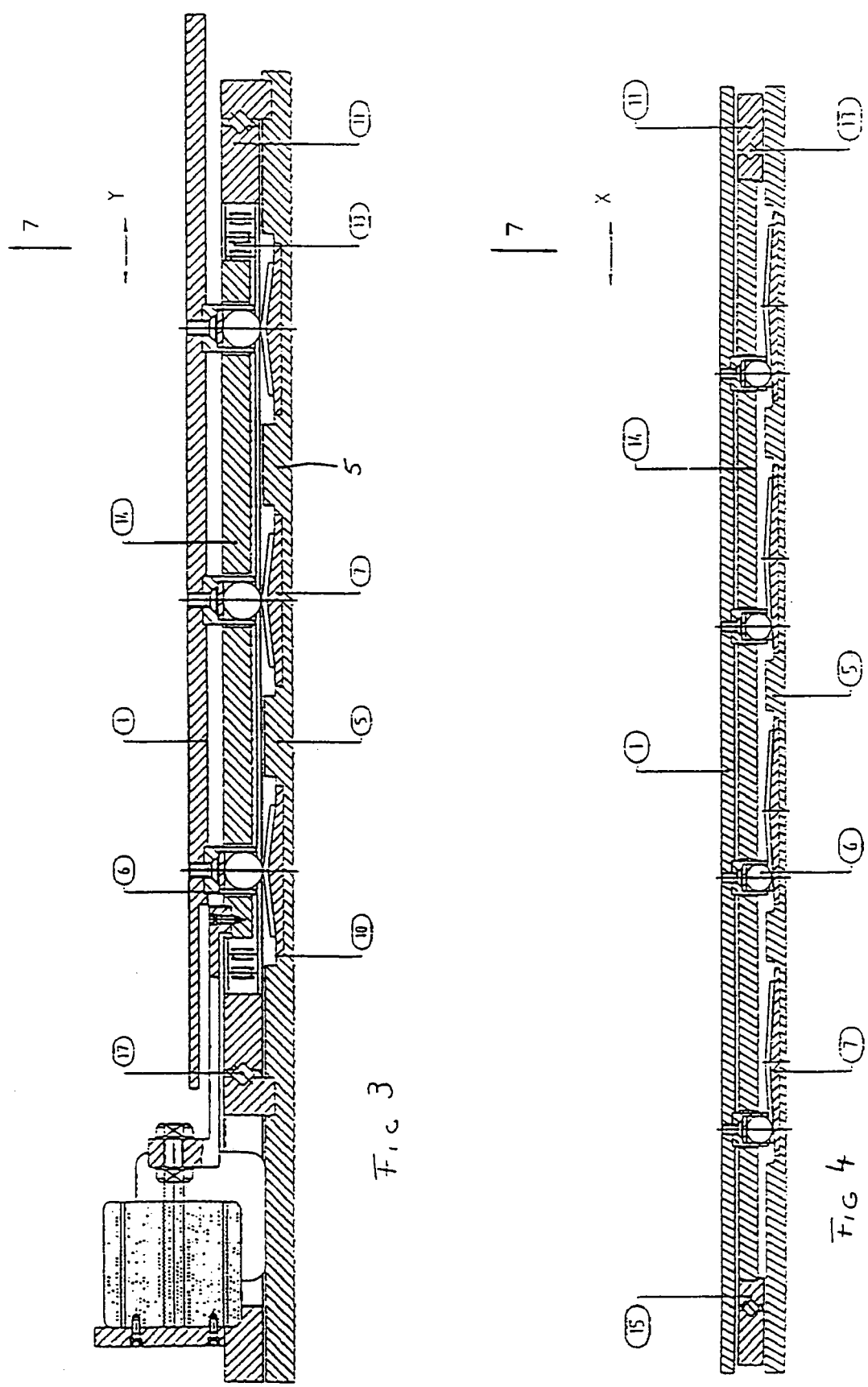

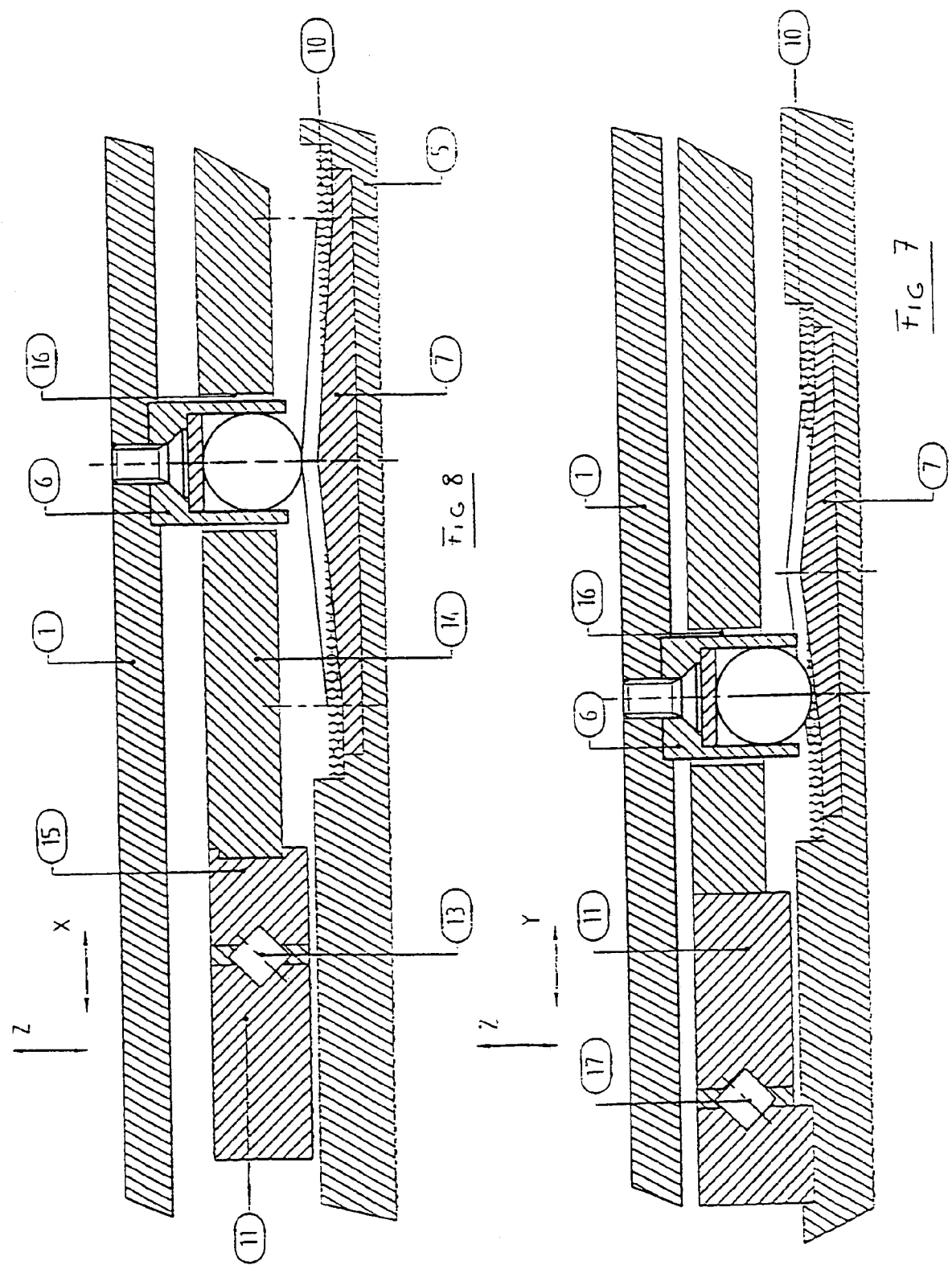

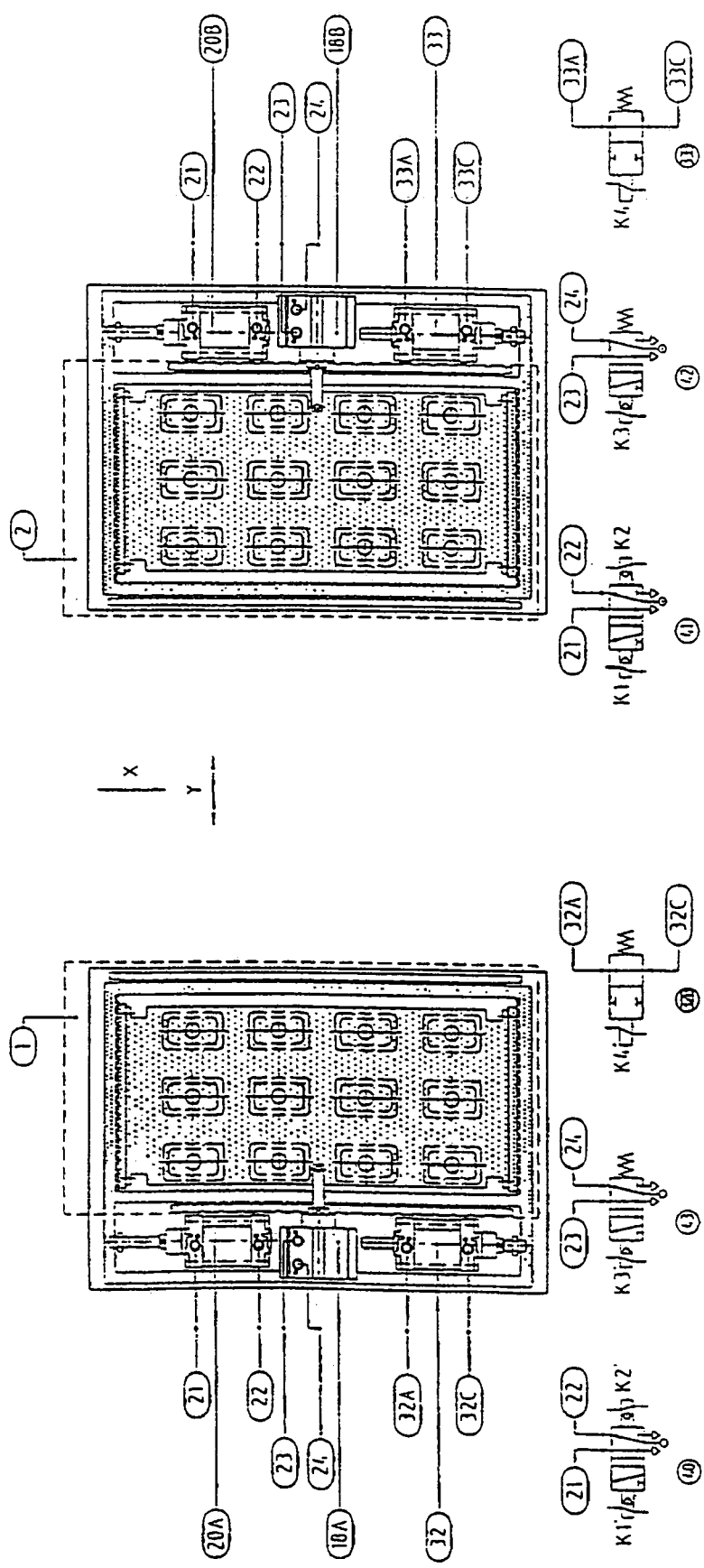

THREE DIRECTIONAL SUPPORT MECHANISM FOR VEHICLE WHEELS

FIELD OF THE INVENTION

The present invention relates to a device for generating a movement of a support in three orthogonal directions X,Y,Z (universal X,Y,Z mechanism), for example, a device generating a movement of a support for a wheel to detect the play of wheels of vehicles and/or of air planes.

BACKGROUND INFORMATION

Belgium Published Patent Application No. 772697 refers to a device having at least one upper-plate intended to support a wheel and linked to a movement-system to make this upper-plate move, so that at least a moment or momentum is generated on the wheel, according to the transversal or longitudinal direction of the vehicle and/or the plane.

Although the device may be suited to examine the play of wheel-parts, it is believed that the examination of the play of some parts was insufficient.

There was therefore a need for simple and safe mechanism for generating a movement of a supporting arrangement or support plate in the three orthogonal directions.

The device according to the invention enables precise movement in the three directions, as well as in a combination thereof.

The device of the invention, when used for examining a play of a movable or rotating elements, such as the play of wheel or piece connected to a wheel, enables a more efficient examination by the use of an additional movement-dimension. This third dimension has a vertical variable amplitude, generating a progressive operation between the actuator plate and the tire. As a result of the creation of this new device, the subject of which corresponds to the above disclosed, i.e. a first purpose of the invention, new application possibilities are brought about.

Other possible purposes of the invention are the following:

a second possible purpose of the invention consists in a device capable of directing a vehicle to a measuring instrument in a conform direction.

a third possible purpose of the invention consists in a device capable of examining plays on parts of the steering-gear.

a fourth possible purpose of the invention consist in a device capable of measuring braking-forces on a wheel.

a fifth possible purpose of the invention consists in device capable of realising at least two of the above mentioned possible purposes of the invention.

A sixth possible purpose of the invention consists in device capable of making precise adjustment (horizontal, vertical and longitudinal) of a working table.

So, the device of this invention is capable of detecting several plays of parts which make wheels rotate or pivotment (swing) around respectively a fixed axle or a steering shaft.

Those plays are:

play in the transversal direction of a wheel: the upper-plate follows the transversal direction;

play in the longitudinal direction of a wheel: the upper-plate follows the longitudinal direction;

play in the vertical direction of a wheel: the upper-plate follows the vertical direction.

In the device of the invention the supporting arrangement (especially the upper-plate) may move in two orthogonal directions (for example, in a horizontal plane) with or without displacement in a third orthogonal direction (for example, vertical displacement). The displacement in the third orthogonal direction of the supporting arrangement or upper-plate is obtained by a specific mechanism causing the movement as a result of one or more movements in the first and/or second orthogonal direction (for example, transversal and/or longitudinal direction).

The device includes a supporting arrangement, such as an upper-plate, which is movable in the third orthogonal direction (direction perpendicular to the two other perpendicular directions) by one or several operations of the movement-system, whereby the mechanism contains at least following elements:

a ball-housing with a ball;

a threshold-block with a bearing-surface, on which the ball rests, whereby the bearing-surface of the threshold-block has at least an inclined surface (for example, a plurality of surfaces) so that, by an operation of the movement-system, the ball moves on one or several inclined surfaces. The inclined surface(s) is (are) designed so that there is a slope causing a movement in the third orthogonal direction (variable Z, more specifically vertical direction) of the supporting arrangement.

According to an exemplary embodiment, the inclined surface(s) is (are) designed so that there is a slope causing the movement of the upper-plate in the third orthogonal direction (such as vertical), as well as in the first and/or second direction (such as transversal and/or longitudinal direction).

According to another exemplary embodiment, the mechanism (by which the supporting arrangement or upper-plate may be moved in the third orthogonal direction) comprises at least the following elements:

a first ball-housing with a first ball;

a second ball-housing with a second ball;

a first threshold-block with a bearing surface on which the first ball rests, and a second threshold-block with a bearing surface on which the second ball rests, whereby the bearing surfaces of the first and second threshold-block have inclined surfaces so that, by an operation of the movement-system, the first ball moves on one or several inclined surfaces of the first threshold-block, while the second ball is moving on one or several inclined surfaces of the second threshold-block, and whereby the inclined surfaces present a suitable slope so that the supporting arrangement or upper-plate is movable in the third orthogonal direction, for example, in the first and second direction (such as transversal and longitudinal direction) as well. This movement of the supporting arrangement or upper-plate in the third orthogonal direction may be coupled with a rotation or a pivotment of the supporting arrangement or upper-plate, for example, with respect to an axis perpendicular to a vertical plane. To obtain this rotation or pivotment, the slope of, e.g. the bearing surface, of the first threshold-block is different from the slope of the bearing surface of the second threshold-block.

For example, the mechanism (by which the supporting arrangement or upper-plate may be moved in the third orthogonal direction) comprises at least following elements:

a first ball-housing with a first ball;

a second ball-housing with a second ball;

a third ball-housing with a third ball;

a fourth ball-housing with a fourth ball;

a first threshold-block with a bearing surface supporting the first ball;

a second threshold-block with a bearing surface supporting the second ball;

a third threshold-block with a bearing surface supporting the third ball;

a fourth threshold-block with a bearing surface supporting the fourth ball, whereby the bearing surfaces of the threshold-blocks have inclined surface(s) so that, by an operation of the movement-system, each ball moves on one or several inclined surfaces of one threshold-blocks, and whereby the inclined surfaces of the threshold-blocks are designed in so that a slope is present in the first and second direction (such as in the transversal and longitudinal direction), said slope causing the movement in the third orthogonal direction (variable Z, such in the vertical direction) of the supporting arrangement or upper-plate, as well as the movement in the first and second orthogonal direction, such as in the transversal and longitudinal direction (with or without rotation or pivotment of the supporting arrangement or upper-plate).

The mechanism of a supporting arrangement or upper-plate may also comprise more than 4 ball-housings and more than 4 threshold-blocks. The use of more than 4 ball-housings may be advantageous for a supporting arrangement or upper-plates intended to support heavy charges, for example for detecting the play of wheels from heavy vehicles.

With another exemplary embodiment comprising more than two supporting arrangements or plates (e.g. 4 or more) one may simultaneously or separately move the supporting arrangement or upper-plates, for example, in the third orthogonal direction (such as in the vertical direction), as well as in the first and second orthogonal direction (such as the transversal and longitudinal direction), with or without rotation or pivotment. Herewith the base of a piece, such as a heavy piece, for example of a wheelbase of a vehicle may be adjusted so that an appropriate position of the piece or vehicle may be obtained for the check of a characteristic, such as height, position of holes, etc. but, for example, for checking head- and cross-lights.

If each bottom-plate or supporting arrangement is mounted on a rotating base plate or if the bottom-plates (e.g. the four bottom-plates) or supporting arrangement are mounted on a rotating base-plate, the possibility to introduce an additional movement (rotation-movement) also exists. In this way, one may rotate the four plates or supporting arrangement so that, e.g. a piece or vehicle may be positioned or adjusted perpendicularly with respect to a predetermined axis or a symmetry axis.

The mechanism of an upper-plate or supporting arrangement may also comprise more than 4 ball-housings and more than 4 threshold-blocks. The use of more than 4 ball-housings depends on the dimensions of the device, as well as on the extent of the load, such as the wheel-load. The dimensions of the device may be chosen according to the kind of controls to be done: Control of passenger-cars, trucks or air-planes.

In yet another exemplary embodiment, the inclined surfaces of the threshold-blocks show a suitable slope, so that the upper-plate remains almost horizontal during a vertical movement of the upper-plate.

To detect the play of wheels on the same axle, the device has at least two upper-plates (e.g. four upper-plates: front-axle+rear axle) each coupled to a mechanism with threshold-blocks and ball-housings.

According to still another exemplary embodiment, at least one or several balls and ball-housings bear the upper-plate or supporting arrangement, said balls moving on their respective threshold-blocks, whereby any movement of the upper-plate or supporting arrangement follows the relief of the threshold-blocks.

The movement-system comprise e.g. at least one cylinder acting on the ball-housing or on an element connected to the ball-housing, to move the ball on the threshold-block.

For example, the movement-system comprises two cylinders. A first cylinder acts on a gliding-frame in a first direction, for example, the longitudinal direction (direction parallel to the symmetry-axis of a vehicle). Inside the gliding-frame there is a middle- or intermediate plate, following the same direction.

A second cylinder is carried by the above mentioned gliding-frame and is directly coupled to the intermediate plate, that may move in a second direction, for example, perpendicular to the first direction, for example, in the transversal direction.

In the holes, for example, the circular holes, of the intermediate plate, the ball-housings of the upper-plate move in a vertical direction, in accordance with the place of the balls which they occupy on the threshold-blocks.

According to yet another exemplary embodiment, the movement-system has a pneumatic circuit with two pneumatic cylinders, effecting the movement of the gliding-frame and the movement of the intermediate plate. The device may be equipped with an oil-circuit with at least one cylinder acting as a blocking-arrangement, for example, so that the balls, in any given position on an inclined plane, may maintain their position in the transversal and/or longitudinal direction.

By moving the supporting arrangement or upper-plate exclusively horizontally in the longitudinal direction, an interesting use may be made of this movement to measure braking-forces on a wheel. It is sufficient to provide the supporting arrangement or upper-plate with a material with a high friction-coefficient. The braking forces may be measured in different ways as for example hydraulically or electronically.

In addition the supporting arrangement or upper-plate may be provided with a buffer-rib. By a transversal movement of the supporting arrangement or upper-plate, one may obtain a changing swing-position of the wheels, that may be used to examine the play on parts of the steering-gear of a vehicle. Here also a progressive effect is a positive element.

Characteristics and details of the invention are given in the annexed conclusions and/or will result from the following description, in which reference is made to the attached drawings.

BRIEF DESCRIPTION OF THE DRAWINGS

FIG. 3 is a cross-sectional view of the movement-mechanism of FIG. 2 along the line III—III.

FIG. 4 is a cross-sectional view of the movement-mechanism of FIG. 2 along the line IV—IV.

FIG. 7 is a partial cross-sectional view along the line III—III with the upper-plate between the lowest and highest position.

FIG. 8 is a partial cross-section view along the line IV—IV with the upper-plate in the highest position.

FIG. 9 is an electro-pneumatic diagram for the operation of the device.

DETAILED DESCRIPTION

Figure 1:
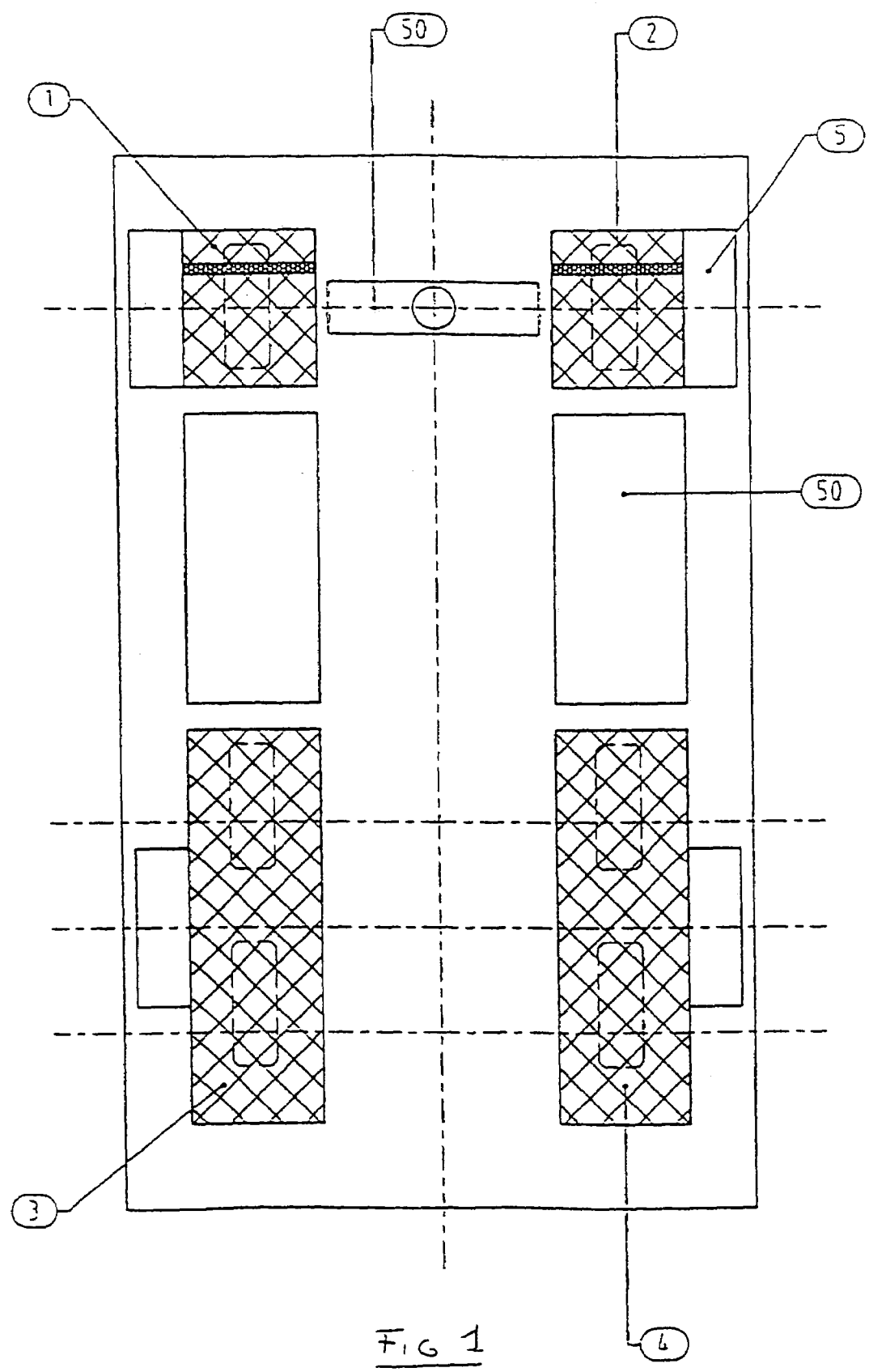
FIG. 1 is an upper-view of a mounting of two devices: a device 1 and 2 for front-axle position; a device 3 and 4 for the rear-axle position.
Figure 2:
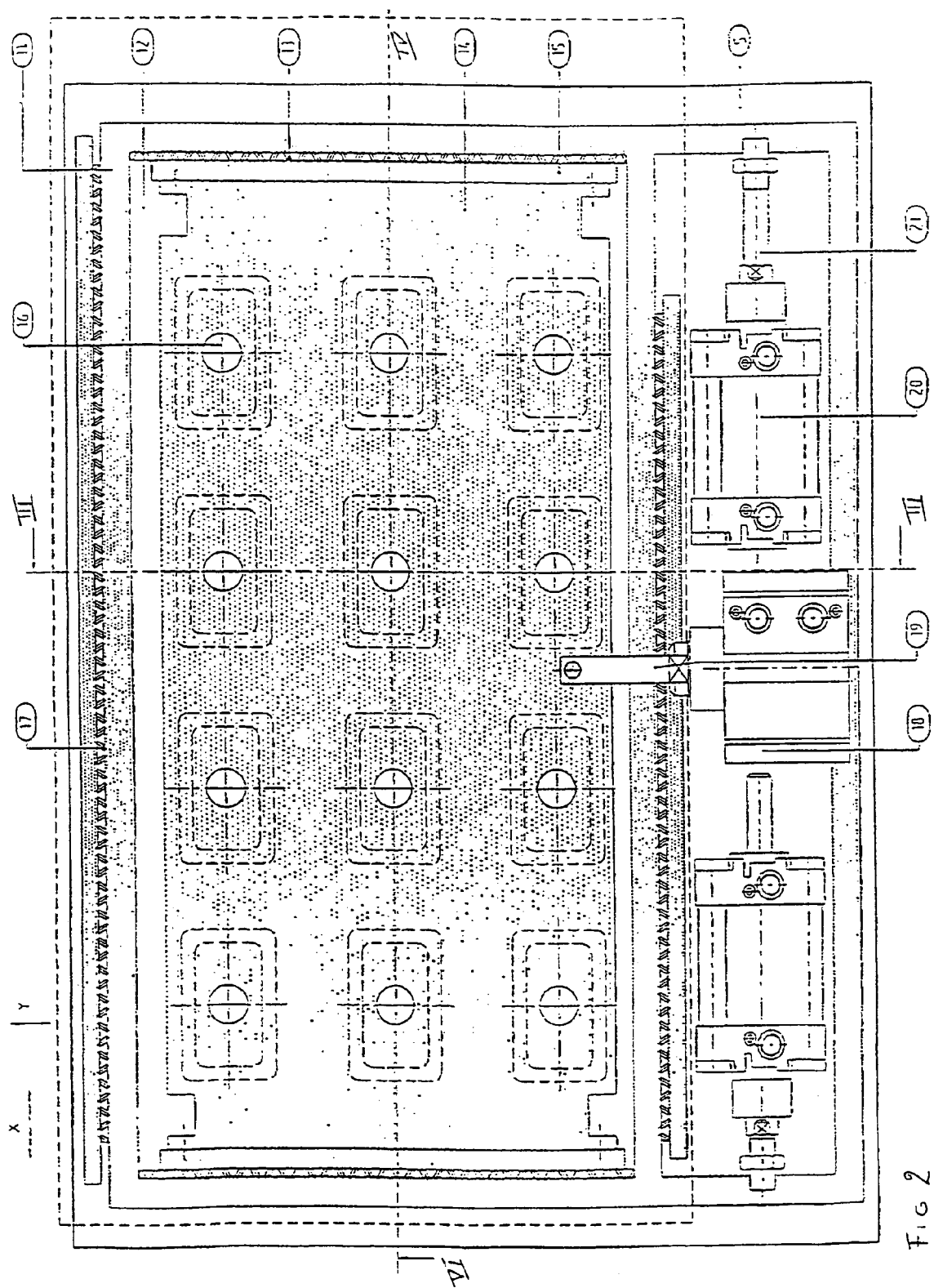
FIG. 2 is an upper-view of parts making up the movement-mechanism of the upper-plate.

The devices shown in FIG. 1 have four distinct supporting arrangements, namely in the present example four upper-plates 1,2,3,4 movable with respect to the floor or to a bottom-plate 5. A device intended for the examination of the wheels of a vehicle is composed of at least two plates, one for a left wheel and one for a right wheel. To lift the mass, supported by one wheel, the device is provided with a jack 50 or a lifting-equipment.

Each upper-plate 1,2,3,4 has rows of ball-housings 6. Each ball of the ball-housings is intended to contact the surfaces of the threshold-blocks 7. The threshold-blocks are fixed on the bottom-plate 5. The base of the threshold-block is mounted in a cavity 10 of the bottom-plate, so that the threshold-block may partly be immersed in an oil-bath so that a lubrication of the ball and the threshold-block takes place.

The mechanism to move the upper-plate in the three different orthogonal directions X (longitudinal), Y (transversal), Z (vertical) is composed of:

a gliding-frame 11 with a central rectangular opening 12 from which two parallel sides are provided with a linear bearing 13;

a middle or intermediate plate 14 from which two sides 15 are coupled to the linear bearings 13 of the frame, whereby the intermediate plate may be moved in the transversal Y direction with respect to the frame 11, the intermediate plate having cavities or guiding-holes 16, in which are put the ball-housings of the upper-plate, so that each ball is touching one threshold-block;

linear bearings 17 located between the frame 11 and the bottom-plate, by which the frame may move in the longitudinal direction X;

a first cylinder 18 mounted on the frame and the shaft 19 of said cylinder acts on the intermediate plate to obtain a movement of the intermediate plate in the transversal direction Y; and a second cylinder 20 mounted on the bottom-plate and the shaft 21 of said cylinder is coupled to the frame to obtain the movement in the longitudinal direction of the frame and thus of the intermediate plate 14 by the action of the cylinder 20.

So, by the working of cylinder 18, the upper-plate 1,2,3,4 is moved in the transversal direction Y, while by the working of cylinder 20, the upper-plate is moved in the longitudinal direction X. During this movement, the balls glide on the surfaces of the threshold-blocks. As those surfaces present a slope with respect to the horizontal planes X,Y, the upper-plate is moved in the vertical direction Z during the working of cylinder 18 and/or 20.

A major characteristic of the device shown in the drawings, is that, while remaining horizontally, the upper-plate may follow any given direction (thus also an arched course), and may be combined with a vertical variable amplitude. The movement-cycle may be used to put a progressive pressure on the contact-surface of the upper-plate with a tire.

Figure 5:
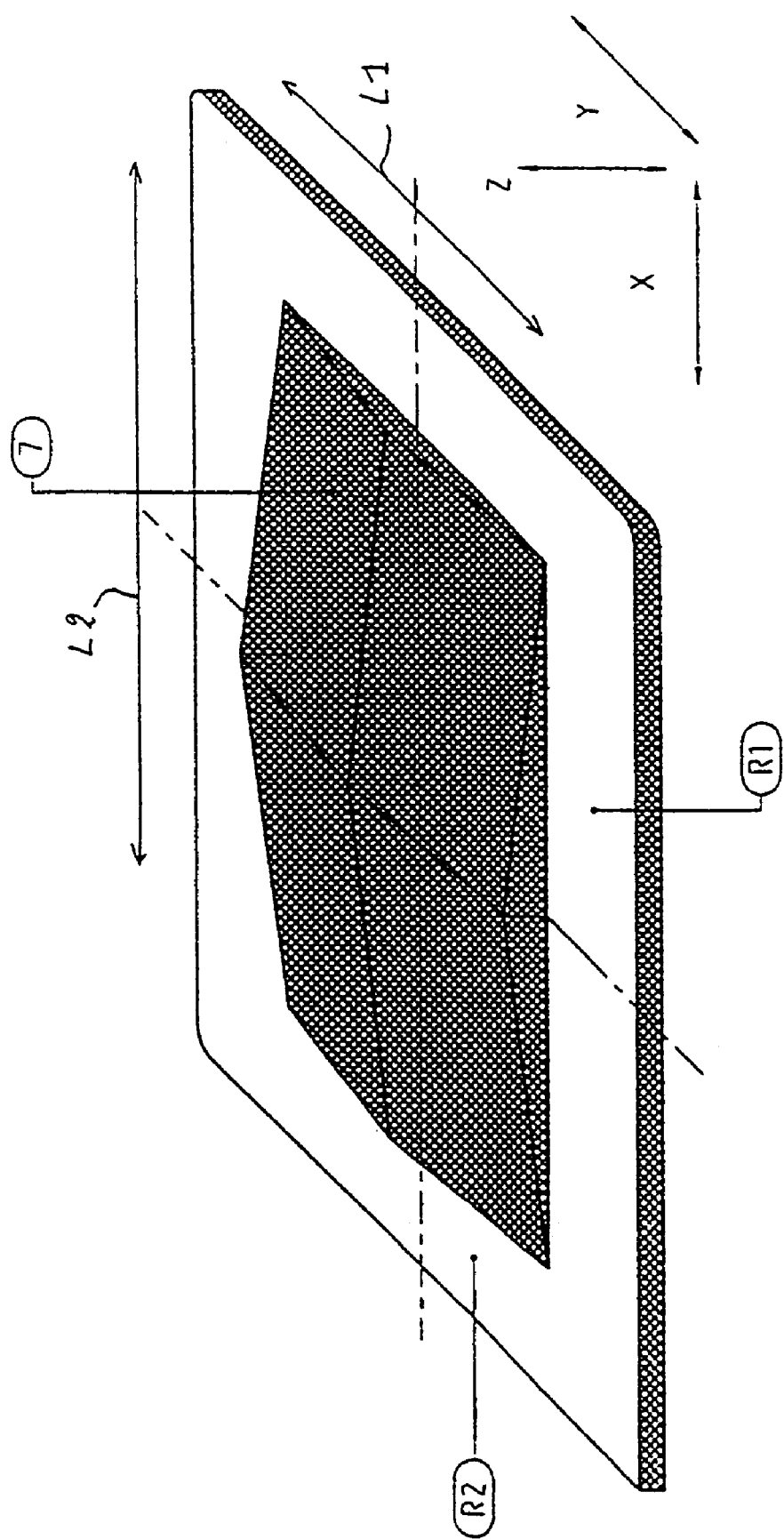
FIG. 5 is a perspective view of a threshold-block.

The movement in the vertical direction, e.g. may be adjusted continuously between 0 and 12 mm (FIG. 5). This occurs in the transversal direction (Y) with a maximal stroke (L1) of, e.g., 50 mm. This results in a vertical movement between 0 and 4 mm. In the longitudinal direction (X) with a stroke (L2) of 100 mm, it results in a vertical movement (Z) between e.g. 0 and 8 mm.

The threshold-block 7 is provided with edges R1 and R2. These edges have horizontal surfaces, so that by the gliding of the balls over those horizontal surfaces a movement in the longitudinal direction (X) or in the transversal direction (Y) is possible without a vertical displacement.

The number of threshold-blocks in the device may be adapted. It depends e.g. from the dimensions of the upper-plate and the mass of the wheel-load.

Figure 6:
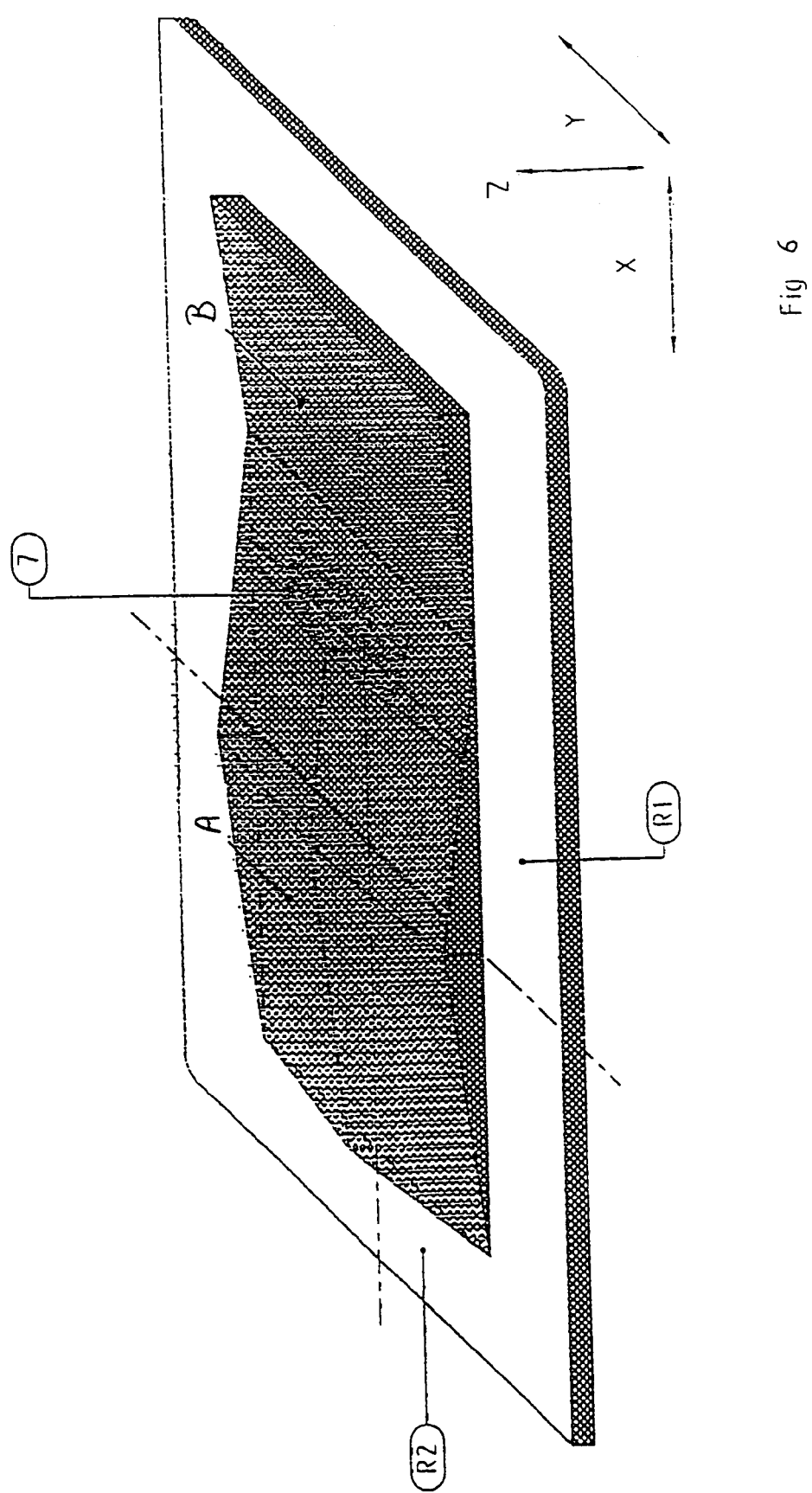
FIG. 6 is a perspective view of a threshold-block with two different profiles (A) and (B).

Threshold-blocks may be built so that they may perform more than one function. FIG. 6 is an example of a threshold-block with a double function. The part A of the profile is analogous to the FIG. 5 and may be used to identify a play. The other part B of the profile may be used for positioning the axles of a vehicle in a suitable way. The separated slope B of the threshold-block from FIG. 6 brings a height-variation of the wheels and a transversal displacement to the axles. Thanks to the height-variation of the plates 1,2,3,4, the wheels of a vehicle may be pressed on four plates lying in the same horizontal plane. By the transversal displacement of the plates 1–2 and/or 3–4, the front- and/or rear-axles may be moved, so that the symmetrical axis or the longitudinal axis of the vehicle may be directed parallel or perpendicular to the reference-axes, proper to a measuring equipment. The form, height, length and width of the profile of the threshold-block are adapted to a specific function or functions for which the device should be used.

The profile of the threshold-block may be modified to adapt, e.g., the maximal vertical movement of the upper-plate. The transversal and/or longitudinal movement in function of the vertical displacement of the upper-plate influences the progressive working of the upper-plate and is determined by the slope-angle of the threshold-block. By the use of the threshold-block, as shown in the drawings, a swing-moment may be developed on the wheel. This is efficient for the examination of the wheel-bearings and ball-articulations of a suspension and is an advantage of the shown device.

The geometry or stereometry or the spatial form (three dimensional form) of the threshold-block(s) may be modified or adapted in function of the requested working of the device.

The device allows to identify even small plays in an early stage. This basic configuration is designated for the connection of peripheral equipment to measure the order of magnitude of specific play.

The electro-pneumatic diagram for the working or operation of the device is shown in FIG. 9.

This circuit-diagram is realized for the operation of the movement of two upper-plates. It comprises:

pneumatic and/or hydraulic components, but may also be operated by electrical servo-motors;

a pneumatic cylinder 18A put in parallel to cylinder 18B connected to the valves 42 and 43 by pipes 23 and 24;

the operation of the switch 31 powers electrically K3 and K3' by which the cylinders 18A and 18B move the upper-plate in the transversal direction Y;

a pneumatic cylinder 20 A put in parallel to cylinder 20 B connected to valves 40 and 41 by pipes 21 and 22;

the operation of the alternating switch 30 powers electrically K1 and K 1' or K 2 and K 2' by which the cylinders 20 A and 20 B move the upper-plate in the longitudinal direction X.

The device may include an oil-circuit with two oil-cylinders 32,33 (one for each upper-plate 1,2). The chambers of each oil-cylinder are connected to each other by the pipes 32A–32C, 33A–33C. A stop-valve 32B,33B is mounted between the conduits 32A–32C, 33A–33C to control the oil-supply between the two chambers of each cylinder 32,33. One part of the double alternating switch powers electrically the coils K4,K4' of the valves 32B and 33B.

The operation of the stop-valves 32B 33B is such that, the stop-valves 32B,33B are closed as soon as the supply of compressed air from the compressor to a chamber of the cylinders 20A,20B is stopped by the double alternating switch 30. By this, the supply of oil between the chambers of the cylinders 32,33 through the conduits 32A and 33A is stopped. The oil-cylinders are used as a blocking-arrangement to maintain the position of the upper-plate as soon as the supply of compressed air to the cylinders 20A,20B is stopped.

The device may be provided with a jack (50) or a lifting-equipment of a lifting-bridge to free one or several wheels. The operation of the lifting-equipment allows one (or several) wheel(s) to be put in a position, where the wheel may barely turn around. This is of advantage for examinations searching for plays which may be identified according to the transversal direction of the wheel, as well as according to the vertical movement of the wheel.

The operation of cycles will be described hereafter.

Figure 10:
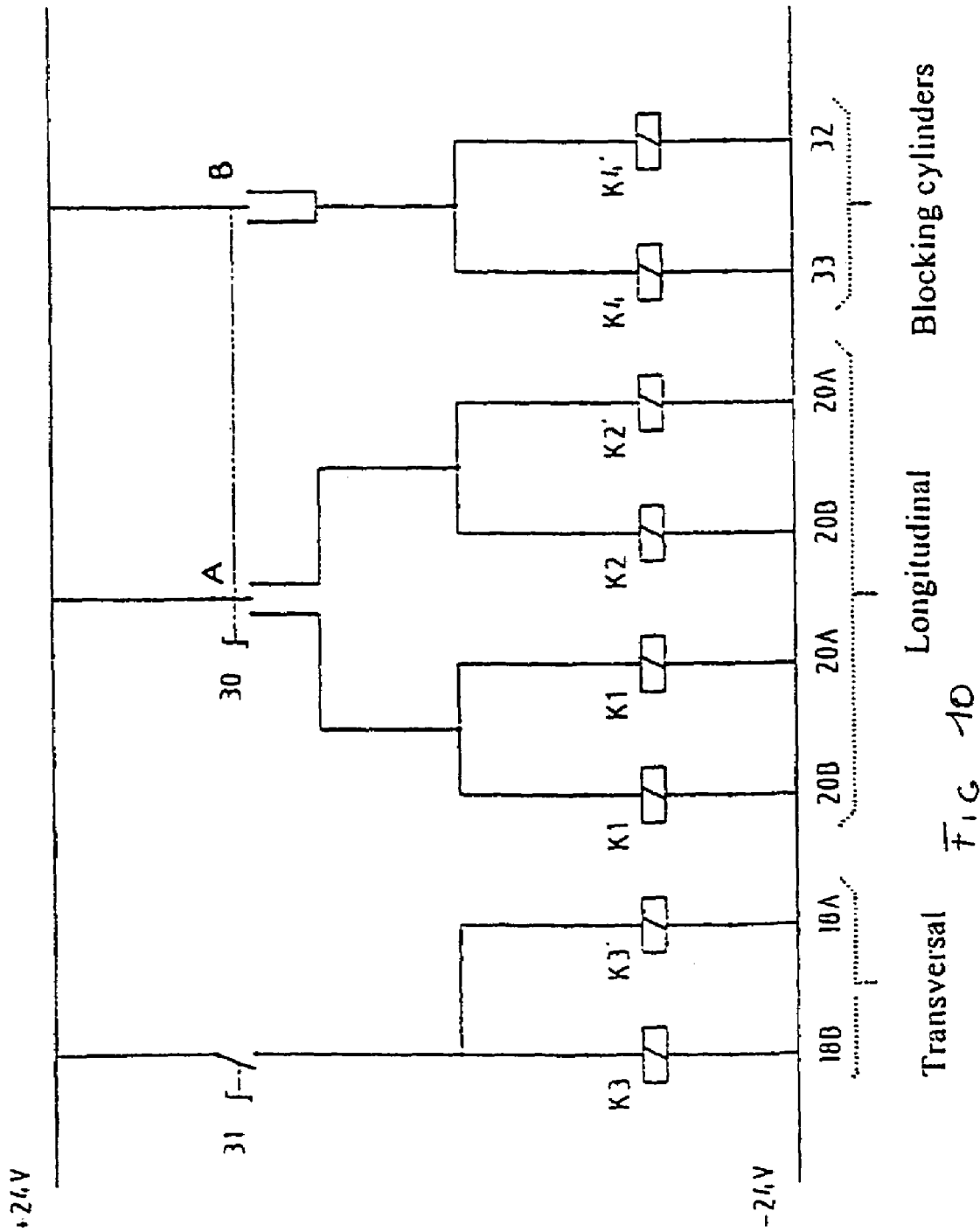
FIG. 10 is an electrical diagram for the operation of the electro-pneumatic valves.

The switch 31 is put in a first position (FIG. 10) (to admit compressed air to the cylinders 18A and 18B through the pipe 24) causing the upper-plates 1,2 to be moved in the transversal direction Y so that the upper-plates 1,2 are moved away from each other. The upper-plates follow the rising slope of the threshold-blocks 7. When the distance between the tire and the plate 1,2 (distance obtained by the lifting-equipment) is smaller than the maximal height of the threshold-block, the plate 1,2 will press to a maximum against the tire in the central position of the threshold-block. Beyond this central position, the plate will follow the declining slope of the threshold-block and progressively relief the tire. By this a first optimal swing-moment is created When the switch 31 is switched off, to admit compressed air in the cylinders 18A and 18 B through the pipe 23, the upper-plates 1,2 will move toward each other in the transversal direction Y. The upper-plates follow the rising slope of the threshold-blocks 7. When the distance between the tire and the plate 1,2 (distance obtained by the lifting-installation) is smaller than the maximum height of the threshold-block, the plate 1,2 will press at a maximum against the tire in the central position of the threshold-block. Beyond this central position the plate will follow the declining slope of the threshold-block and progressively relief the tire. Hereby, a reverse swing-moment is originated (with respect to the first swing-moment).

To increase the vertical pressure on the tire, the switch 30 may be switched on, thus activating the cylinders 20A and 20B. By those cylinders 20A, 20B the plates 1,2 are moved in the longitudinal direction. The upper-plates 1,2 follow the rising slope in the longitudinal direction of the threshold-blocks. The plates 1,2 take vertically a position, that is increased, between 0 mm and the maximal height-variation of the threshold-block in the longitudinal direction (e.g. 8 mm). By further movement in the longitudinal direction beyond the central position on the threshold-block, the upper-plates go down according the declining slope (in the longitudinal direction) of the threshold-blocks.

In practice the switch 30 may be pushed in a first position to allow the supply of compressed air to the cylinders 20A,20B, so that the upper-plates are moved forwards. During this movement the upper-plates rise to a maximum. Afterwards those upper-plates go down to a minimum.

By pushing the switch 30 in a second position, the compressed air will activate the cylinders 20A,20B in the reverse direction so that the upper-plates 1,2 are moved backwards.

The oil-cylinders 32,33 follow the movement of the air-cylinders 20A,20B and block immediately the movement of the plates 1,2 when the switch 30 is moved into the central position (FIG. 10) (in this central position there is no compressed air supplied to the cylinders 20A,20B).

Concretely, with the switch 30 the upper-plates 1,2 may be adjusted on any given level by a movement in the longitudinal direction of the plates 1,2.

For example, the ratio height-variation compared to the movement in the longitudinal and/or transversal direction fluctuates between 1/20 and 1/3. In a specific version this ratio is equal to 1/6 (a displacement of the plate on 1 mm in the longitudinal and/or transversal direction results in vertical displacement of the upper-plates 1,2 on 0.16 mm (1/6).

The variation of 3-dimensional forces (vertical—longitudinal direction—transversal direction) is a result of the combination of two variable height-levels of the threshold-blocks.

So, the device may generate amplitudes from which the order of magnitude may be brought in accordance with the order of magnitude characterising vertical plays.

The operation of the apparatus may also be automated, at least partly. E.g. by replacing the switch 31 by a continuous control (with a make and break-contact) by which the forward and backward transversal displacement is realized automatically.

In the example the plate follows in the transversal direction a height, variable between 0 and 4 mm and this from the starting-point of the plate in the longitudinal direction to the end-point in the longitudinal direction.

According to another exemplary embodiment, one or more of the upper plates 1,2,3,4 of the device shown in the figures may be replaced by a plate provided with a supporting rod adapted for supporting an axle, such as the axle or rod on which a wheel is mounted.

The device of the invention may also be used for other purposes than the check of parameters of a vehicle, airplane, etc. For example, the device of the invention may be used for analyzing the position of holes in a piece, for ensuring an exact position for a piece, for analyzing mechanical parameters or resistance or stability for beams, construction elements, houses (for example on reduced scale), structure, for analyzing the impact of vibration, etc.

The invention claimed is:

1. A device to generate a movement in three orthogonal directions, the device comprising:
 a movement system;
 at least one supporting arrangement coupled to the movement-system, the movement-system being configured to move the supporting arrangement in accordance with a first orthogonal direction and in accordance with a second orthogonal direction perpendicular to the first orthogonal direction; and
 a mechanism configured to be acted upon by the movement system to move the supporting arrangement in a third orthogonal direction perpendicular to the first and second orthogonal directions, the mechanism including at least one ball-housing, a ball arranged in the ball-housing, and a threshold-block having a bearing-surface on which the ball rests, the bearing-surface of the threshold-block having at least one slope;

wherein the slope of the bearing surface permits the supporting arrangement to move in the third orthogonal direction in accordance with at least one operation of the movement-system in the first orthogonal direction and at least one operation of the movement-system in the second orthogonal direction.

2. The device of claim 1, wherein the slope of the bearing surface permits the supporting arrangement to move in one of the first orthogonal direction, the second orthogonal direction, and the third direction.

3. The device of claim 2, wherein the mechanism includes first and second ball-housings, first and second balls respectively arranged in the first and second ball-housings, and first and second threshold-blocks having respective first and second bearing-surfaces on which the first and second balls respectively rest, the first and second bearing surfaces of the first and the second threshold-blocks being inclined, the first ball moving on the inclined first bearing surface of the first threshold-block, the second ball moving on the inclined second bearing surface of the second threshold-block.

4. The device of claim 1, wherein the supporting arrangement includes an upper-plate receiving at least one ball-housing directed to the threshold-block.

5. The device of claim 1, wherein the movement-system includes at least one cylinder configured to act on the ball-housing to move the ball on the threshold-block.

6. The device of claim 1, further comprising:
a first plate, a second plate, and a frame, the first plate being coupled to the ball-housing; wherein the movement-system includes first and second cylinders and a frame including the first cylinder, the first cylinder being configured to act on the first plate, the second cylinder being movably mounted with respect to the first plate, the second cylinder connecting the second plate with the frame and being configured to act on one of the second plate and at least one portion of the frame.

7. The device of claim 6, further comprising:
linear bearings configured to couple the first plate to the support arrangement.

8. The device of claim 1, further comprising:
an oil-circuit associated with each of the at least one supporting arrangement, the oil-circuit having at least one cylinder as a blocking-arrangement; wherein
the movement-system includes a pneumatic circuit having two pneumatic cylinders.

9. The device of claim 1, further comprising a connecting arrangement to connect to an external instrument.

10. The device of claim 9, wherein the instrument includes at least one of an instrument configured to detect a parameter of an object coupled to an element in contact with the supporting arrangement, an instrument configured to measure a parameter of the object coupled to the element.

11. The device of claim 1, wherein the at least one supporting arrangement includes a plurality of supporting arrangements, each of the supporting arrangements being separately moveable.

12. The device of claim 1, further comprising a second mechanism coupled to the supporting arrangement to add an additional movement of the supporting arrangement.

13. The device of claim 12, wherein the second mechanism adds a rotational movement.

14. The device of claim 1, wherein the supporting arrangement includes an upper-plate having a buffer-rib.

15. The device of claim 14, wherein the upper-plate includes one of a friction material and a friction layer.

16. The device of claim 1, wherein the supporting arrangement includes an upper-plate configured to support a wheel of a movable carrier.

17. The device of claim 1, wherein the supporting arrangement includes an upper-plate coupled to the movement system, the movement system being configured to provide the supporting arrangement with momentum in at least one of, the first orthogonal direction, the second orthogonal direction, and the third direction.

18. A device to generate a movement in three orthogonal directions, the device comprising:
a movement system;
at least one supporting arrangement coupled to the movement-system, the movement-system being configured to move the supporting arrangement in accordance with a first orthogonal direction and in accordance with a second orthogonal direction perpendicular to the first orthogonal direction; and
a mechanism configured to be acted upon by the movement system to move the supporting arrangement in a third orthogonal direction perpendicular to the first and second orthogonal directions, the mechanism including first, second, third, and fourth ball-housings, first, second, third, and fourth balls respectively arranged in the first, second, third, and fourth ball-housings, and first, second, third, and fourth threshold-blocks having respective inclined bearing surfaces to respectively support the first, second, third, and fourth balls, the bearing surfaces having respective slopes; wherein
wherein the slopes of the bearing surfaces permit the supporting arrangement to move in the third orthogonal direction in accordance with at least one operation of the movement-system in the first orthogonal direction and at least one operation of the movement-system in the second orthogonal direction.

19. The device of claim 18, wherein the slopes of the inclined surfaces of the threshold-blocks permit the supporting arrangement to remain substantially in a plane perpendicular to the third orthogonal direction during a displacement of the supporting arrangement in the third orthogonal direction.

20. The device of claim 18, wherein the at least one supporting arrangement includes a plurality of supporting arrangements coupled to the mechanism.

21. The device of claim 20, wherein the plurality of supporting arrangements include four supporting arrangements.

22. The device of claim 20, wherein the plurality of supporting arrangements include respective mountings.

23. The device of claim 19
wherein the at least one supporting arrangement includes a first group of at least two supporting arrangements and a second group of at least two supporting arrangements the supporting arrangements being coupled to the mechanism.

24. The device of claim 18, wherein the supporting arrangement includes an upper-plate including at least one of the first, second, third, and fourth ball-housings directed to at least one of the first, second, third, and fourth threshold-blocks.

25. The device of claim 18, wherein the movement-system includes at least one cylinder acting on the first, second, third, and fourth ball-housings to move the first, second, third, and fourth balls on the first, second, third, and fourth threshold blocks, respectively.

26. The device of claim 18, further comprising:
a first plate, a second plate, and a frame, the first plate being coupled to the first, second, third, and fourth ball-housings; wherein the movement-system includes first and second cylinders and a frame including the first cylinder, the first cylinder being configured to act on the first plate, the second cylinder being movably mounted with respect to the first plate, the second cylinder connecting the second plate with the frame and being configured to act on one of the second plate and at least one portion of the frame.

27. The device of claim 26, further comprising linear bearings to connect the first plate to the supporting arrangement.

28. The device of claim 18, further comprising:
a first plate coupled to the first, second, third, and fourth ball-housings; wherein the movement-system includes first and second cylinders and a frame including the first cylinder, the first cylinder being configured to act on the first plate, the second cylinder being movably mounted with respect to the first plate, the second cylinder being configured to act on one of a second plate and at least one portion of the frame; wherein the supporting arrangement, the supporting arrangement including an upper-plate supporting the first, second, third, and fourth ball-housings, the first plate being provided with holes, the ball-housings being respectively arranged in the holes, so that the first second, third, and fourth balls of the first, second, third, and fourth ball-housings touch the first, second, third, and fourth threshold-blocks.

29. The device of claim 18, further comprising:
an oil-circuit associated with each of the at least one supporting arrangement, the oil-circuit having at least one cylinder as a blocking-arrangement; wherein
the movement-system includes a pneumatic circuit having two pneumatic cylinders.

30. The device of claim 18, further comprising a connecting arrangement to connect to an external instrument.

31. The device of claim 30, wherein the instrument includes at least one of an instrument configured to detect a parameter of an object coupled to an element in contact with the supporting arrangement, an instrument configured to measure a parameter of the object coupled to the element.

32. The device of claim 18, further comprising a second mechanism coupled to the supporting arrangement to add an additional movement of the supporting arrangement.

33. The device of claim 32, wherein the second mechanism adds a rotational movement.

34. The device of claim 18, wherein the supporting arrangement includes an upper-plate having a buffer-rib.

35. The device of claim 34, wherein the upper-plate includes one of a friction material and a friction layer.

36. The device of claim 18, wherein the supporting arrangement includes an upper-plate configured to support a wheel of a movable carrier.

37. The device of claim 18, wherein the supporting arrangement includes an upper-plate coupled to the movement system, the movement system being configured to provide the supporting arrangement with momentum in at least one of, the first orthogonal direction, the second orthogonal direction, and the third direction.

38. The device of claim 37, wherein the supporting arrangement includes an upper-plate configured to support a wheel of a movable carrier.

39. The device of claim 38, wherein the movable carrier includes one of a vehicle and an air plane.

40. A method to detect the play of at least one part of a movable carrier, the part being linked to a movable supporting arrangement, the method comprising:
detecting the play; and
while detecting the play, moving the supporting arrangement using a device to generate a movement in three orthogonal directions, the device including a movement system; at least one supporting arrangement coupled to the movement-system, the movement-system being configured to move the supporting arrangement in accordance with a first orthogonal direction and in accordance with a second orthogonal direction perpendicular to the first orthogonal direction; and a mechanism configured to be acted upon by the movement system to move the supporting arrangement in a third orthogonal direction perpendicular to the first and second orthogonal directions, the mechanism including at least one ball-housing, a ball arranged in the ball-housing, and a threshold-block having a bearing-surface on which the ball rests, the bearing-surface of the threshold-block having at least one slope; wherein the slope of the bearing surface permits the supporting arrangement to move in the third orthogonal direction in accordance with at least one operation of the movement-system in the first orthogonal direction and at least one operation of the movement-system in the second orthogonal direction.

41. The method of claim 40, wherein the movable carrier includes one of a vehicle and an air plane.

42. The method of claim 40, wherein the part of the movable carrier is coupled to a wheel of the carrier, the wheel of the carrier being placed on the supporting arrangement.

43. The method of claim 42, wherein the part of the movable carrier includes a part of a steering-gear.

44. A method for measuring the braking forces of at least one wheel of a movable carrier, the method comprising:
placing the wheel on a movable supporting arrangement;
measuring the braking forces; and
while measuring the braking forces, moving the supporting arrangement using a device to generate a movement in three orthogonal directions, the device including a movement system; at least one supporting arrangement coupled to the movement-system, the movement-system being configured to move the supporting arrangement in accordance with a first orthogonal direction and in accordance with a second orthogonal direction perpendicular to the first orthogonal direction; and a mechanism configured to be acted upon by the movement system to move the supporting arrangement in a third orthogonal direction perpendicular to the first and second orthogonal directions, the mechanism including at least one ball-housing, a ball arranged in the ball-housing, and a threshold-block having a bearing-surface on which the ball rests, the bearing-surface of the threshold-block having at least one slope; wherein the slope of the bearing surface permits the supporting arrangement to move in the third orthogonal direction in accordance with at least one operation of the movement-system in the first orthogonal direction and at least one operation of the movement-system in the second orthogonal direction.

45. The method of claim 44, wherein the supporting arrangement is configured to be moved in one of the first orthogonal direction, the second orthogonal direction, and the third direction.

46. A method to direct a vehicle to light-measuring equipment, the vehicle including wheels, the method comprising:

placing at least one of the wheels of the vehicle on a movable supporting arrangement to direct the vehicle with respect to the light-measuring equipment; and moving the supporting arrangement using a device to generate a movement in three orthogonal directions, the device including a movement system; at least one supporting arrangement coupled to the movement-system, the movement-system being configured to move the supporting arrangement in accordance with a first orthogonal direction and in accordance with a second orthogonal direction perpendicular to the first orthogonal direction; and a mechanism configured to be acted upon by the movement system to move the supporting arrangement in a third orthogonal direction perpendicular to the first and second orthogonal directions, the mechanism including at least one ball-housing, a ball arranged in the ball-housing, and a threshold-block having a bearing-surface on which the ball rests, the bearing-surface of the threshold-block having at least one slope; wherein the slope of the bearing surface permits the supporting arrangement to move in the third orthogonal direction in accordance with at least one operation of the movement-system in the first orthogonal direction and at least one operation of the movement-system in the second orthogonal direction.

47. The method of claim 46, wherein the supporting arrangement is configured to be moved in one of the first orthogonal direction, the second orthogonal direction, and the third direction.

* * * * *